April 7, 1959  B. P. CAMPBELL  2,880,757
DISTRIBUTOR FOR LAWN SPRINKLING SYSTEMS
Filed June 12, 1957
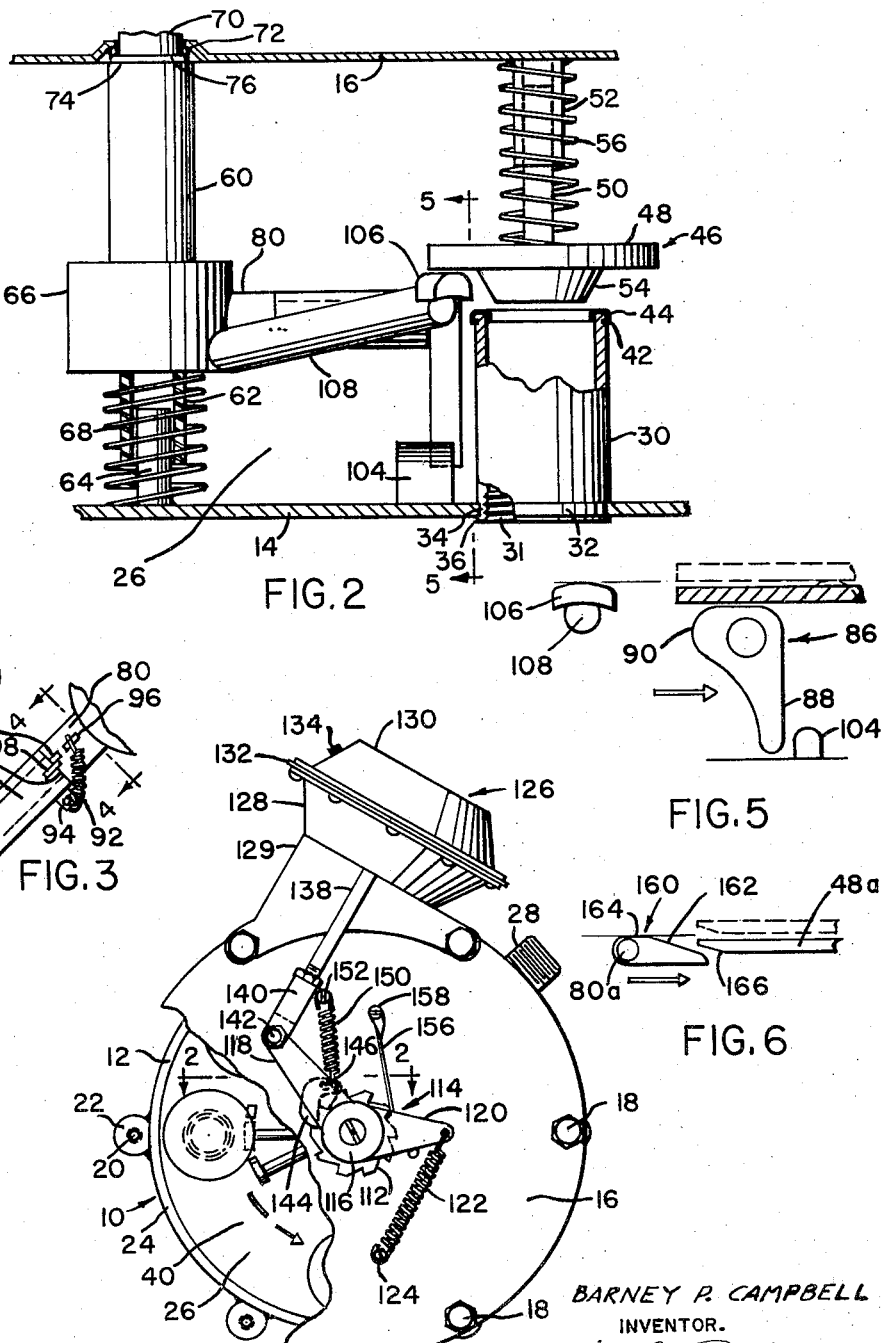
BARNEY P. CAMPBELL
INVENTOR.
BY *J. C. Baisch*
ATTORNEY United States Patent Office 2,880,757
Patented Apr. 7, 1959

2,880,757

DISTRIBUTOR FOR LAWN SPRINKLING SYSTEMS

Barney P. Campbell, Rivera, Calif.

Application June 12, 1957, Serial No. 665,288

5 Claims. (Cl. 137—627)

This invention relates generally to water sprinkling systems and relates more particularly to distributor means for such systems.

While the invention has particular utility in connection with sprinkler or irrigation systems for lawns and the like, and is shown and described embodied in such a system, it is to be understood that its utility is not confined thereto.

In sprinkler systems for watering or irrigating lawns there are a plurality of sprinkler heads located at various strategic locations about the lawn and said sprinkler heads are connected by water lines or pipes with a distributor device which in turn is connected to a source of water and is adapted to selectively supply water to said sprinkler heads. Such systems also include mechanism for controlling the operation of the distributor so that water will be provided to certain heads for a predetermined period of time and then to certain other heads et cetera so that various portions of the lawn will be successively watered and the entire lawn given the proper amount of water over a predetermined period of time.

Various known difficulties and problems are involved in mechanisms of such systems which are generally complicated and not always reliable, and it is an object of the present invention to provide a distributor for lawn sprinkling systems and the like that will overcome such problems.

Another object of the invention is to provide a device of this character that is simple and sturdy in construction.

Still another object of the invention is to provide a device of this character that is reliable and effective in operation.

Broadly, the present invention comprises a distributor device having means movable to certain preselected stations to actuate valves which control the supply of water to various sprinkler heads of the sprinkler system.

It is a further object of the invention to provide means in such a device for positively opening the valves and positively holding same open throughout the period selected for supplying water to predetermined sprinkler heads.

A still further object of the invention is to provide a device of this character having a mechanism adapted to go through a complete cycle from a position where all of the valves are closed, said mechanism successively opening and successively closing the valves until it returns to the position whereat all of said valves are closed.

Another object of the invention is to provide a device of this character that is relatively inexpensive to manufacture.

The characteristics and advantages of the invention are further sufficiently referred to in connection with the following detailed description of the accompanying drawings which disclose certain arrangements. After considering these examples, skilled persons will understand that variations may be made without departing from the principles disclosed, and any structures, arrangements or modes of operation that are properly within the scope of the appended claims are contemplated.

Referring to the drawings:

Fig. 1 is a top plan view of a water distributor device embodying the present invention, a portion of the cover being broken away to show the interior of the device;

Fig. 2 is a view of a valve and the valve opening and holding means as seen from line 2—2 of Fig. 1;

Fig. 3 is a top plan view of the valve raising means;

Fig. 4 is a sectional view taken on line 4—4 of Fig. 3;

Fig. 5 is a partial sectional view taken on line 5—5 of Fig. 2; and

Fig. 6 is a diagrammatic end view of an alternative valve lifter and holding means.

Referring more particularly to the drawings, there is shown a large, cup shaped bowl, indicated generally at 10, having a cylindrical wall 12 extending upwardly from a bottom wall 14. The bowl is open at the top but is provided with a cover plate 16 secured to the top of said bowl by means of bolts or screws 18 received in openings provided therefor in the cover and registering with respective tapped bores 20 in lugs 22 on the exterior of the wall 12 and adjacent the top thereof. Suitable gasket means, not shown, is used to provide a seal between the upper edge 24 of the wall 12 and the under side of the cover plate 16. The interior of the bowl comprises a chamber 26 into which water is supplied by means of an inlet connection 28 connected to any suitable source of water, not shown.

There are a plurality of outlets for the chamber 26, each outlet comprising a tube 30 having a reduced diameter lower end portion 32 received in an opening 34 provided therefor in the bottom wall 14. The free end of the tube 30 is overturned or riveted, as at 36, to secure said tube in said opening 34. The lower end portion of the tube 30 is internally threaded at 31 for threadable reception of a pipe or the like, not shown, which leads to and is connected with one or more sprinkler heads, also not shown. The tubes 30 extend upwardly from the bottom wall 14 and are annularly spaced apart an equal distance from each other, except that one tube is omitted to provide a neutral or rest position, indicated at 40, the spacing between the tubes 30 at opposite sides of the rest position being twice the spacing between any other two tubes.

Adjacent the upper end of each tube 30 is an external groove for reception of an edge portion 42 of a seal 44 of any suitable material such as rubber or the like, said seal having the cross sectional shape of a C turned with the open part at the bottom. The seal 44 extends about the upper edge of the tube 30 and serves as the seat of a valve member, indicated generally at 46.

Valve member 46 comprises a disc 48 having an upwardly extending valve stem 50 slidably received in a tubular guide 52, said disc, stem and guide being axially aligned with the tube 30. The guide 52 has its upper end secured to the under side of the cover plate 16 by any suitable means such as brazing or the like. On the under side of the valve disc 48 is an axially arranged, inverted frusto-conical part 54 which is adapted to partially enter the upper end of the tube 30 and seat on the seal 44. A coil spring 56 is disposed about the stem 50 and guide 52 and reacts between the cover plate 16 and valve disc 48 to yieldingly urge the valve member to the closed position whereas said frusto-conical part 54 seats on said seal 44. Thus, these outlet valves are normally closed.

There is provided means for opening the valves and holding same open, and said means comprises a vertical shaft 60 axially arranged with respect to the bowl and cover plate. The lower end portion 62 of said shaft is of reduced diameter and is tubular for reception of a pin 64 having the lower end thereof secured to the bottom 14 of the bowl by any suitable means, such as brazing or the like, said pin 64 serving as bearing on which the tubular portion 62 is adapted to rotate. Shaft 60 is provided with an enlarged portion or hub 66 located intermediate the bottom 14 and cover plate 16 and the shaft is urged upwardly by a spring 68 disposed about the tubular portion 62 and pin 64 and reacting between said bottom 14 and the under side of the hub 66. At the upper end of shaft 60 there is a reduced diameter part 70 which extends through an opening provided therefor in the cover plate 16 and a seal 72 is provided on said part 70. Between the seal 72 and shoulder 74 at the junction of shaft 60 and part 70 thereof is a washer 76. Spring 68, by urging the shaft upwardly, makes seal 72 more effective to prevent the escape or leakage of water from the opening in the cover plate 16 through which the part 70 of said shaft extends.

From the hub 66 there is a radially extending shaft 80 having a reduced diameter portion 82 at the outer end on which is rotatably mounted a sleeve 84 having a valve lifting member, indicated generally at 86, at the outer free end and of the general shape of a bell crank. Valve lifting member 86 includes a normally depending finger 88 and a cam part 90 at right angles to the finger 88 and at the upper trailing end of said valve lifting member. A spring 92 is provided to yieldingly urge the sleeve and valve lifting member counter clockwise, as viewed in Fig. 5, said spring having one end connected to an ear 94 secured to said sleeve and having the other end secured to an ear 96 secured to the adjacent portion of shaft 80. Spring urged rotation of said sleeve is limited by engagement of a lug 98 secured to said sleeve and freely overlapping the adjacent portion of the shaft 80 and a lug 100 secured to said adjacent portion of shaft 80. When lug 98 engages lug 100 the valve lifting member 86 is disposed in the position shown in Fig. 5. Spring 92 also serves to retain the sleeve 84 and member 86 on the reduced diameter portion 82 of shaft 80 and against the shoulder 102 at the junction of said portion 82 and shaft 80.

As the shaft 60 rotates the valve lifting member 86 travels in an annular path of such radius that said member 86 passes beneath the inner edge portions of the valve members 46. In order to actuate the valve lifting member 86 to lift the respective valves 46 as said member 86 passes beneath the discs thereof there is provided respective bosses 104 which are secured to the bottom 14 and extend upwardly therefrom in the path of the finger 88 and at the approach side of the respective valves. Thus, as the valve lifting member 86 approaches a valve 46, the finger 88 thereof engages the adjacent boss 104 which causes said member 86 to rotate clockwise as it is carried along its annular path and passes beneath the disc of said valve member. Clockwise rotation of the member 86 causes the cam portion 90 to engage the underside of the inner edge portion of the disc and raise the valve member 46 upwardly to unseat the part 54 and permit water to flow into the respective tube 30 and into the pipe connected to said tube so that the water will be conducted to the sprinkler head or heads connected to said pipe. The portion of the lawn served by said sprinkler head or heads is thus irrigated or watered.

In order to retain the respective valve open for a predetermined period of time during which the above referred to portion of the lawn is watered, there is provided a shoe 106 at the outer or free end of an arm 108 which has its opposite end secured to the hub 66 at the trailing side of the shaft 80. The top side of shoe 106 is curved downwardly to the front and rear edges for smoother engagement with the disengagement from the valve discs and said shoe travels in substantially the same annular path as the valve lifting member 86 and said shoe passes beneath the valve disc of the valve member raised by said member 86 so that by the time the finger 88 of said member 86 has passed the boss 104 and spring 92 moves said member to the normal position said shoe is disposed beneath the said disc 48 for retaining the valve in the open position, it being understood that the rotation of shaft 60 is halted, as will be described hereinafter, when said shoe is beneath the disc of the valve 46 that has just been opened.

There is means for intermittently actuating the shaft 60, said means comprising a ratchet 112 attached to the part 70 of the shaft 60. A bell crank, indicated generally at 114, has a hub 116 rotatable on part 70 of shaft 60 and two levers, 118 and 120 respectively. Levers 118 and 120 are yieldingly urged clockwise by a spring 122 having one end connected to lever 120 adjacent the end thereof, the other end of said spring being hooked to a screw 124 received in a tapped bore provided therefor in the cover plate 16.

Lever 118 is connected to a pressure operated actuator, indicated generally at 126, of well known character, said actuator comprising a pair of hollow shells 128 and 130 with a flexible diaphragm 132 clamped therebetween to provide a chamber at each side of said diaphragm. The shell 128 has a bracket 129 attached at the top side of the cover plate 16 by means of two of the screws 18, said actuator being operably positioned for connection to the lever 118 as will be described hereinafter. The chamber at the outer side of the actuator, defined by shell 130, has a pressure connection 134 connected to a source of fluid pressure, such as water, said connection being controlled by any of the usual timing mechanisms which periodically open a valve, not shown, to supply actuating pressure to said outer chamber and then release said pressure.

The diaphragm 132 is centrally connected to a rod 138 with a clevis or yoke 140 adjustably connected to the outer end thereof, said clevis operably receiving the outer end portion of lever 118 therebetween and being connected thereto by means of a screw 142.

Beneath the lever 118 is a pawl 144 pivoted at 146 adjacent one end to said lever 118, the opposite end of said pawl being adapted to engage the teeth of the ratchet 112. There is a portion of the pawl 144 which extends outwardly of the pivot 146 to which one end of a spring 150 is secured. The opposite end of said spring is hooked to a screw 152 screwed into a tapped bore provided therefor in the cover plate 16, said spring being adapted to yieldingly urge the ratchet engaging end into operable engagement with said ratchet.

Means is provided to frictionally hold the ratchet from inadvertent movement, said means comprising a leaf spring 156 having one end secured to the cover by means of a screw 158, the opposite end yieldingly engaging the outer ends of the teeth of the ratchet.

First, let it be assumed that the valve lifting member 86 and the valve holding shoe 106 are at the rest or neutral position 40. Periodically, at predetermined time intervals, the timing mechanism above referred to operates to supply actuating pressure to the actuator 126, whereupon the levers 118 and 120 are moved in the counterclockwise direction, as shown in Fig. 1, to the next station. During this movement the valve raising element 86 raises the first valve in the counterclockwise direction from said neutral position and the shoe 106 moves beneath the disc 48 of said valve where it remains until the actuator is again energized to move the valve raising element 86 and shoe 106 to the next station, the above described operation of said element and shoe being repeated. With the opening of each valve a different portion of the lawn is irrigated or watered and when the cycle of operation is completed said member 86 and shoe 106 have been moved to the neutral or rest position 40. Of course any suitable number of outlet valves may be provided according to the requirements of any particular installation. The number of teeth on the ratchet 112 corresponds to the number of stations for the valve raising and holding mechanism. Since there are ten ratchet teeth, there are ten stations, including the neutral station and nine outlet openings with their valves.

In Fig. 6 there is shown an alternative arrangement wherein valve lifter and holding means comprises a member 160 having a cam surface 162 at the upper side of the leading end and a part 164 engageable beneath the valve disc 48a which has an annular edge portion 166 on the under side having inclination corresponding to that of the cam surface 162 and engageable thereby. The member 160 is attached to the outer end of an arm 80a attached to the hub 66 and as said member 160 is moved with rotation of shaft 60 the cam surface 162 engages the disc 48a and raises same. Rotation of shaft 60 is continued until the surface 164 of the member 160 is positioned beneath the disc 48a whereupon the rotation of shaft 60 ceases and the valve is held open.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the embodiments therebefore described being merely one arrangement.

I claim:

1. A water distributor mechanism for lawn sprinkling systems, comprising: a cup shaped bowl having a cylindrical wall extending upwardly from a bottom wall and having a water inlet; a cover plate removably attached to the open end of said bowl; a plurality of annularly arranged and spaced outlet means, each of said outlet means comprising a tube upstanding from the bottom wall and having an outlet adapted to be connected to a water supply line leading to sprinkler head means, said tube having an external annular groove adjacent the upper end thereof; a seal for the upper end of said tube to serve as a valve seat, the cross sectional shape of said seal being generally a C turned with the open side down; a movable valve member including a disc of substantially greater diameter than the external diameter of the tube and a stem extending axially upwardly of said disc; a tubular guide having its upper end secured to the cover plate and slidably receiving the upper end portion of said stem; yielding means urging said valve toward said valve seat for engagement therewith; a vertical shaft arranged axially of said bowl, said shaft including a hub intermediate the ends thereof and a reduced diameter upper end portion adapted to extend outwardly through an opening provided therefor in the cover plate, said shaft having a bore extending axially from the lower end thereof; a pin secured to the bottom of the bowl and extending into said shaft bore so that said shaft is rotatable on said pin; yielding means urging said shaft upwardly; sealing means on the reduced diameter portion of the shaft and located at the inner end of said reduced diameter portion; a horizontal shaft extending radially from the hub and having a reduced diameter portion; a sleeve rotatably mounted on said reduced diameter portion of the horizontal shaft; valve lifting means carried by said sleeve adjacent the outer end thereof, said valve lifting means including a depending finger and a cam part adjacent the upper end of said means, said valve lifting means having a path of travel inwardly of the outlet tubes but beneath the inner edge portions of the valve discs; valve holding means trailing said valve lifting means in substantially the same path of travel and positioned higher than said lifting means when the latter is in its normal position; means connecting said valve holding means to said vertical shaft; a lug positioned at the approach side of each of said outlet tubes and engageable by the depending finger of said valve lifting as the latter means moves in its path of travel to effect rotation of said valve lifting means to cause the cam portion thereof to engage the underside of the valve disc and raise said valve to the open position, said valve holding means then moving under said raised disc to hold same in the valve open position; yielding means urging said valve lifting means to the normal position; means limiting spring urged rotation of said valve lifting means to its normal position; and means for actuating said vertical shaft to effect movement of the valve raising means and the valve holding means from one station to another whereat respective valves are opened by the valve opening means and held open by the valve holding means, there being an outlet at one station to provide a neutral or rest position.

2. A water distributor mechanism for lawn sprinkling systems, comprising: a cup shaped bowl having a cylindrical wall extending upwardly from a bottom wall and having a water inlet; a cover plate removably attached to the open end of said bowl; a plurality of annularly arranged and spaced outlet means, each of said outlet means comprising a tube upstanding from the bottom wall and having an outlet adapted to be connected to a water supply line leading to sprinkler head means; a seal for the upper end of said tube to serve as a valve seat; a movable valve member including a disc of substantially greater diameter than the external diameter of the tube and a stem extending axially upwardly of said disc; guide means for said stem, said guide means being connected to said cover plate; yielding means urging said valve toward said valve seat for engagement therewith; a vertical shaft, axially arranged relative to said bowl and including a hub intermediate the ends thereof and a reduced diameter upper end portion adapted to extend outwardly of an opening provided therefor in the cover plate, said shaft having a bore extending axially from the lower end thereof; a pin secured to the bottom of the bowl and extending into said shaft bore so that said shaft is rotatable on said pin; yielding means urging said shaft upwardly; sealing means between the upper end of said shaft and said cover and sealingly pressed between said upper shaft end and cover by the action of said spring; a horizontal shaft extending generally radially from the hub; a sleeve rotatably mounted on said horizontal shaft; valve lifting means; means connecting said valve lifting means to said shaft, said valve lifting means having rotating movement on said connecting means and including a finger having a normal inoperative position and a cam part, said valve lifting means having a path of travel inwardly of the outlet tubes but beneath the inner edge portions of the valve discs; yielding means urging said lifting means to said normal position; valve holding means trailing said valve lifting means and having substantially the same path of travel; means connecting said valve holding means to said vertical shaft; a lug positioned at the approach side of each of said outlet tubes and engageable by said finger and as said valve lifting means moves further in its path of travel said finger is rotated from its inoperative position to cause the cam portion thereof to engage the underside of the valve disc and raise said valve to the open position, said valve holding means then moving under said raised disc and holding same in the valve open position; means for actuating said vertical shaft to effect movement of the valve raising means and the valve holding means from one station to another whereat respective valves are opened by said opening means and held open by the valve holding means.

3. A water distributor mechanism for lawn sprinkling systems, comprising: means defining a cylindrical chamber having bottom and top walls and a water inlet; a plurality of annularly arranged and spaced outlet means, each of said outlet means comprising a tube upstanding from the bottom wall and having an outlet adapted to be connected to a water supply line; a movable valve member for closing the upper end of said tube, said valve member including a disc of substantially greater diameter than the external diameter of the tube and a valve stem for said disc; guide means for said stem; yielding means urging said valve toward the upper end of said tube to close same; a rotatable, axial shaft operably disposed in said chamber; a support member connected to said shaft; valve lifting means movably carried by said support member, said valve lifting means including a cam part and a second part and having a path of travel inwardly of the outlet tubes but beneath the inner edge portions of the valve discs; valve holding means trailing said valve lifting means and having substantially the same path of travel, means connecting said valve holding means to said axial shaft; a lug positioned at the approach side of each of said outlet tubes and engageable by the second part of said valve lifting means as the latter moves in its path of travel to effect movement of said valve lifting means to cause the cam portion thereof to engage the underside of the valve disc and raise said valve to the open position, said valve holding means then moving under said raised disc to hold same in the valve open position; and means for actuating said shaft to effect movement of the valve raising means and the valve holding means from one station to another for effecting opening of respective valves as said opening means moves from one station to another and to maintain said respective valves open at each said station.

4. A water distributor mechanism for lawn sprinkling systems, comprising: means defining a cylindrical chamber having bottom and top walls and a water inlet; a plurality of annularly arranged and spaced outlet means, each of said outlet means comprising a tube upstanding from the bottom wall and having an outlet adapted to be connected to a water supply line; a movable valve member for closing the upper end of said tube, said valve member including a disc of substantially greater diameter than the external diameter of the tube and a valve stem for said disc; guide means for said stem; yielding means urging said valve toward the upper end of said tube to close same; a rotatable, axial shaft operably disposed in said chamber; a lug positioned adjacent each of said outlet tubes; a support member connected to said shaft; valve lifting means movably carried by said support member, said valve lifting means including a cam part and a second part and having a path of travel inwardly of the outlet tubes but beneath the inner edge portions of the valve disc and engageable with said lug as said valve lifting means moves in its path of travel to thereby effect movement of said valve lifting means to cause the cam portion thereof to engage the underside of the valve disc and raise said valve to the open position; valve holding means trailing said valve lifting means and having substantially the same path of travel; means connecting said valve holding means to said axial shaft; said valve holding means moving under said raised disc to hold same in the valve open position; and means for actuating said shaft to effect movement of the valve raising means and the valve holding means from one station to another for effecting opening of respective valves as said opening means moves from one station to another and to maintain said respective valves open at each said station.

5. In a water distributor mechanism for lawn sprinkling systems: wall means defining a chamber having a water inlet; a plurality of annularly arranged and spaced outlet means; a movable valve member for each outlet means, yielding means urging said valve movable member toward the closed position; a rotatable shaft axially disposed with respect to said outlet means; valve lifting means; means connecting said valve lifting means to said shaft, said valve lifting means being movable relative to said connecting means and including a cam part and a second part and having a path of travel adjacent said movable valve means; valve holding means trailing said valve lifting means; means connecting said valve holding means to said shaft; fixed means engageable by the second part of said valve lifting means as the latter moves in its path of travel to effect movement of said valve lifting means to cause the cam portion thereof to engage a part of the movable valve member and raise said valve to the open position, said valve holding means then engaging a part of said valve to hold same in the valve open position; and means for actuating said shaft to effect movement of the valve raising means and the valve holding means from one station to another for effecting opening of respective valves as said opening means moves from one station to another and to maintain said respective valves open at each said station.

References Cited in the file of this patent

UNITED STATES PATENTS

| | | |
|---|---|---|
| 1,634,081 | Putnam | June 28, 1927 |
| 2,026,271 | Cooper | Dec. 31, 1935 |
| 2,262,224 | Daniels | Nov. 11, 1941 |